(12) United States Patent
Baracca et al.

(45) Date of Patent: Jul. 5, 2022
(10) Patent No.: US 11,378,128 B2

(54) HOUSING ELEMENT WITH END COVER HAVING AN OPTIMIZED SEALING ACTION

(71) Applicant: Aktiebolaget SKF, Gothenburg (SE)

(72) Inventors: Fausto Baracca, Massa (IT); Ettore Bertelloni, Massa (IT); Andrea A. Bertolini, Carrara (IT); Fabio Falaschi, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/196,323

(22) Filed: Mar. 9, 2021

(65) Prior Publication Data

US 2021/0285496 A1 Sep. 16, 2021

(30) Foreign Application Priority Data

Mar. 16, 2020 (IT) .................. 102020000005506

(51) Int. Cl.
| | |
|---|---|
| F16C 19/06 | (2006.01) |
| F16C 23/08 | (2006.01) |
| F16C 33/78 | (2006.01) |
| F16C 33/72 | (2006.01) |
| F16C 19/34 | (2006.01) |
| F16C 33/76 | (2006.01) |

(52) U.S. Cl.
CPC ........... *F16C 33/723* (2013.01); *F16C 19/06* (2013.01); *F16C 19/34* (2013.01); *F16C 23/084* (2013.01); *F16C 33/76* (2013.01); *F16C 33/783* (2013.01); *F16C 33/7863* (2013.01)

(58) Field of Classification Search
CPC ........ F16C 19/06; F16C 19/34; F16C 23/082; F16C 23/084; F16C 23/086; F16C 33/723; F16C 33/7823; F16C 33/76; F16C 33/783; F16C 33/7863; F16C 33/7889; F16J 15/3248; F16J 15/3256; F16J 15/3264
See application file for complete search history.

(56) References Cited

U.S. PATENT DOCUMENTS

| | | | |
|---|---|---|---|
| 3,934,953 A * | 1/1976 | Tooley | F16C 35/00 |
| | | | 29/898.07 |
| 3,951,783 A | 4/1976 | Cochran | |
| 4,875,786 A * | 10/1989 | DeWachter | F16C 33/76 |
| | | | 384/903 |

(Continued)

FOREIGN PATENT DOCUMENTS

| | | |
|---|---|---|
| CN | 108591274 | 9/2018 |
| DE | 2839584 | 3/1980 |

(Continued)

OTHER PUBLICATIONS

International Search Report for corresponding Italy Patent Application No. 102020000005506 dated Dec. 15, 2020.

*Primary Examiner* — Phillip A Johnson
(74) *Attorney, Agent, or Firm* — Reed Smith LLP

(57) ABSTRACT

A housing element having a casing provided with a spherical seat, a bearing unit located inside the spherical seat of the casing and provided with a radially inner ring, and a plastic end cover provided with a radial through-hole so that a machine shaft can be inserted inside it, the end cover being integral with the shaft and rotatable with the shaft, and the end cover being provided with an elastomeric seal for forming a static seal on the shaft.

11 Claims, 3 Drawing Sheets

(56) References Cited

U.S. PATENT DOCUMENTS

| | | | | | |
|---|---|---|---|---|---|
| 4,881,829 | A | * | 11/1989 | Koelsch | F16J 15/344 384/480 |
| 5,328,276 | A | * | 7/1994 | Linteau | F16C 33/76 384/477 |
| 5,711,617 | A | * | 1/1998 | Scheller | F16C 23/084 384/903 |
| 6,250,813 | B1 | * | 6/2001 | Thibault | F16C 33/7806 277/581 |
| 7,419,305 | B2 | * | 9/2008 | Nisley | F16C 33/76 384/477 |
| 7,909,717 | B2 | * | 3/2011 | Boussaguet | F16C 33/76 474/136 |
| 2011/0070990 | A1 | | 3/2011 | Yamashita et al. | |
| 2019/0170256 | A1 | | 6/2019 | Hoehle | |

FOREIGN PATENT DOCUMENTS

| | | | |
|---|---|---|---|
| DE | 202008002709 | | 4/2008 |
| ES | 2214155 | | 9/2004 |
| GB | 1097953 A | * | 4/1965 |
| GB | 2058957 | | 4/1981 |
| IT | 201800020209 | | 6/2020 |
| JP | 57025518 A | * | 2/1982 |
| JP | 2015190482 | | 11/2015 |

\* cited by examiner

HOUSING ELEMENT WITH END COVER HAVING AN OPTIMIZED SEALING ACTION

CROSS-REFERENCE RELATED APPLICATION

This application is based on and claims priority to Italian Patent Application No. 102020000005506 filed on Mar. 16, 2020, under 35 U.S.C. § 119, the disclosure of which is incorporated by reference herein.

FIELD

The present disclosure relates to a housing element provided with an end cover having optimized sealing means and suitable for applications in the manufacturing industry.

BACKGROUND

As is known, in the manufacturing industry, generally attention is being increasingly focused on developing new machines and machine designs aimed at improving the safety level and quality of the finished products. A housing element for such machines normally comprises a casing and an end cover and is designed for various kinds of machining operations.

The housing element is fixed to a frame of the machine and for given machining operations is connected to a rotating shaft of the machine by means of a bearing unit. In this case the end cover of the housing element is said to be of the "open" type since it must allow the passage, inside the housing element, of the machine shaft. These housing elements may be made of plastic material or metallic material, typically stainless steel.

BRIEF DESCRIPTION OF THE DRAWINGS

Various embodiments will now be described with reference to the attached drawings which illustrate a non-limiting example of embodiment of the housing element, in which.

DETAILED DESCRIPTION

One of the problems to be solved for those operating in the sector is that of ensuring effective sealing of the housing element with respect to water or, more generally, any contaminant from the external environment. The problem is particularly present, for example, in the food industry, but in general it is a problem which must be solved for the entire manufacturing industry, bearing in mind that these housing elements are mounted horizontally and therefore the cover has precisely the function of protecting the bearing unit from dripping water.

In the case of housing elements with an end cover of the open type sealing between the shaft and cover is necessary in order to ensure a seal with respect to the exterior. This seal is of the static type since the cover is integrally fixed to the shaft by means of locking with the rotating ring of the bearing unit and, therefore, the cover is rotatable together with the shaft at the same angular speed.

In particular, solutions are known in which the end cover, which is made of pressed steel or cast iron, is locked onto the shaft by means of a special locking means (Allen screw, pin and the like). These solutions, however, do not ensure an effective seal, in particular in the case where, for given requirements, for example in order to be able to reduce the weight of the housing element, the end cover is made of plastic material.

There therefore exists the need to define a housing element provided with an end cover having an optimized seal, which does not have the aforementioned drawbacks, namely which is able to keep the water and other contaminants in general on the outside of the housing element itself with excellent results in terms of quality and safety.

The object of the present disclosure is to provide a housing element provided with an end cover having optimized sealing means, which does not have the aforementioned drawbacks.

According to the present disclosure a housing element comprising a casing, a bearing unit and an end cover as discussed below is provided.

In particular, the present disclosure relates to a housing element comprising a casing, a cover and a bearing unit. More particularly, the disclosure is designed to ensure a reliable sealing system between an end cover of the "open" type made of composite material, "open" being understood as meaning that the cover is passed through by a shaft connected to a machine onto which the housing element is fixed.

Figure 1:
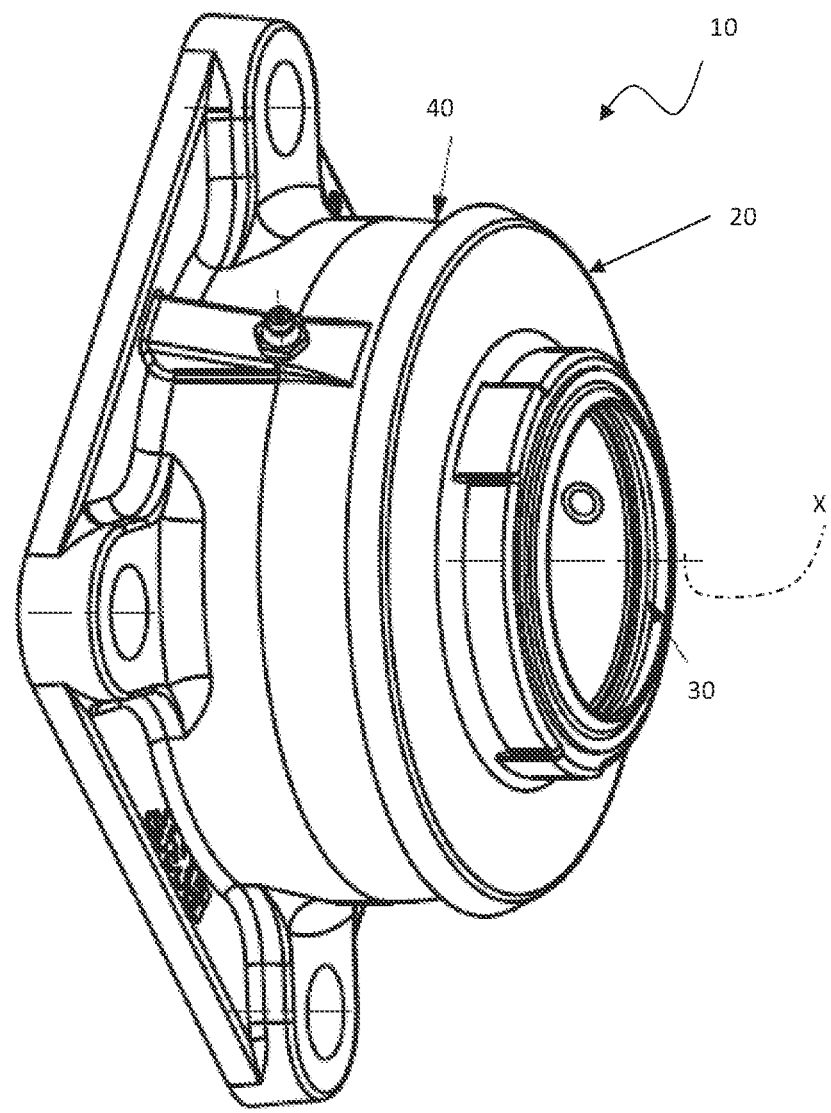
FIG. 1 shows an axonometric view of a housing element according to an embodiment of the disclosure.
Figure 2:
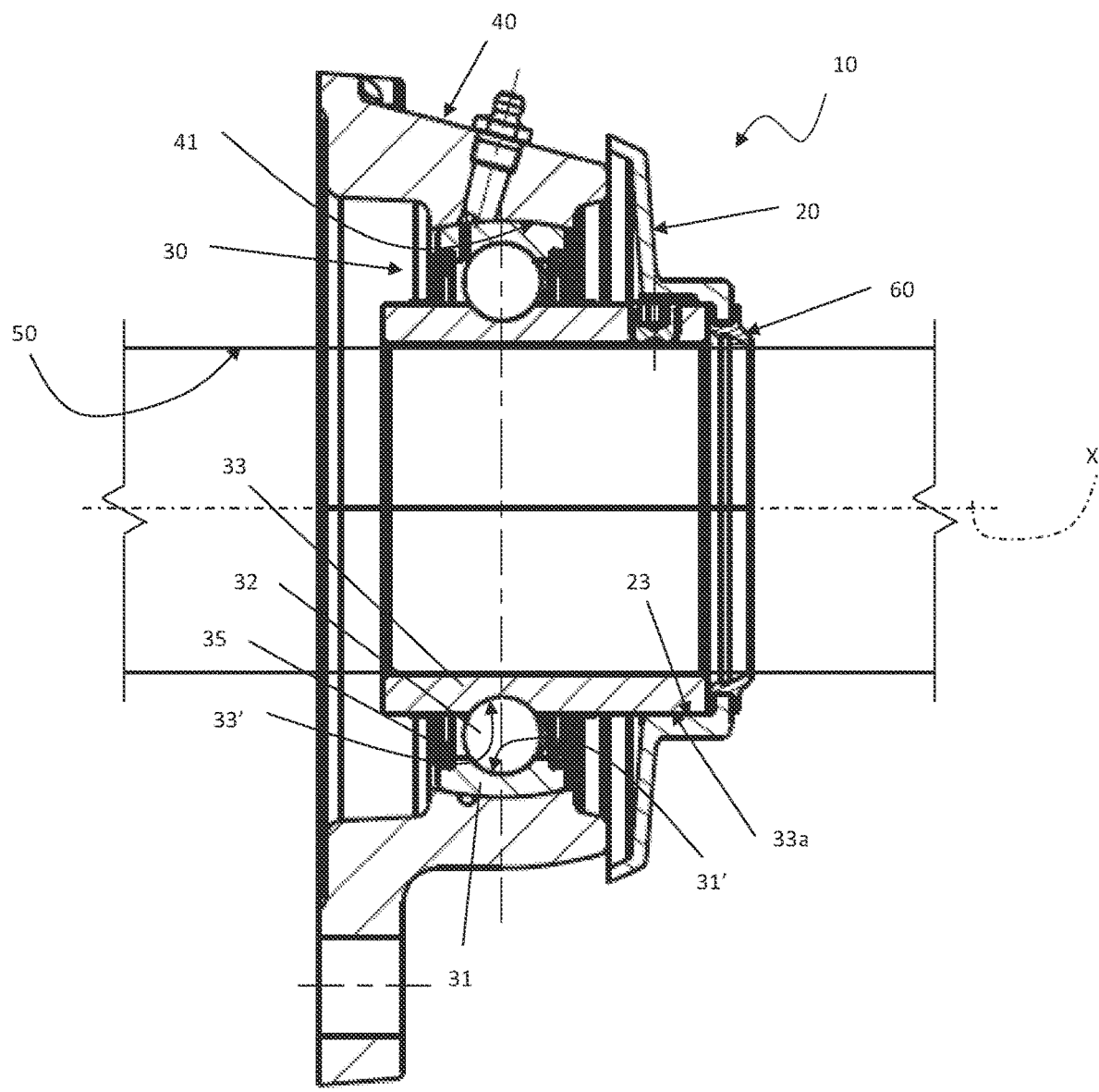
FIG. 2 shows a cross-sectional view of the housing element according to FIG. 1 mounted on a shaft for connection to a machine of the known type.

With reference now to FIGS. 1 and 2, below an embodiment of a housing element according to the present disclosure is described purely by way of example.

With reference to FIG. 1, the housing element 10 for applications in the manufacturing industry—for example the textile, mineral, motor vehicle or food industry or also for applications in agricultural machines or in industrial plants—comprises a casing 40 with axial symmetry relative to an axis X, an end cover 20 and a bearing unit 30 housed inside it. This housing element 10, which forms part of the present disclosure, may be used in the aforementioned industrial applications so as to be secured against a machine frame.

The bearing unit 30 in turn comprises:
a stationary radially outer ring 31;
a radially inner ring 33, which is rotatable about a central axis of rotation X of the bearing unit 30;
a row of rolling elements 32, in this example balls, arranged between the radially outer ring 31 and the radially inner ring 33.

In the whole of the present description and in the claims, the terms and the expressions indicating positions and orientations such as "radial" and "axial" are understood as being in relation to the central axis of rotation X of the bearing unit 30.

The radially outer ring 31 is provided with a radially outer raceway 31', while the radially inner ring 33 is provided with a radially inner raceway 33' for allowing rolling of the row of rolling members 32 arranged between the radially outer ring 31 and the radially inner ring 33. For the sake of simpler graphical illustration the reference number 32 will be attributed both to the individual balls and to the row of balls. Again for the sake of simplicity, the term "ball" may be used by way of example in the present description and in the attached drawings instead of the more generic term "rolling member" (and likewise the same reference numbers will be used).

The bearing unit 30 is also be provided with sealing device 35 for sealing off the bearing unit from the external environment. Below the sealing device 35 may be indicated also more simply as seals 35, obviously understood as referring to the same component.

The casing 40 is preferably made of cast iron, for example grey cast iron, or steel or stainless steel and is provided with a spherical seat 41 inside which the bearing unit 30 is housed.

The end cover 20 is made of plastic material, for example black-coloured polyamide PA6 CF30. It is provided with an axial through-hole 24 so that a shaft 50 of a machine (which is known and therefore not described) may be inserted inside it. The end cover 20 is mounted so that it is integral with the shaft 50 and therefore rotatable at the same angular speed as the shaft. The end cover 20 has a particular shape designed to ensure that water and contaminants cannot penetrate inside the housing element. This is obtained by assembling on the end cover 20 an elastomeric sealing means 60, for example made of polytetrafluoroethylene (PTFE or Teflon). The main characteristics of the sealing means are as follows: the sealing means 60, which may also be referred to as sealing element 60 or seal 60, is designed so as to be suitable for non-sliding contact—namely for providing a static type seal—since the shaft 50 and the end cover 20 are integral with each other and therefore rotate at the same angular speed. The static type seal therefore allows an optimized performance of the seal itself to be obtained; the elastomeric material of the sealing means 60 is a particular compound which is able to withstand high temperatures, in particular temperatures of up to 150° C.

Figure 3:
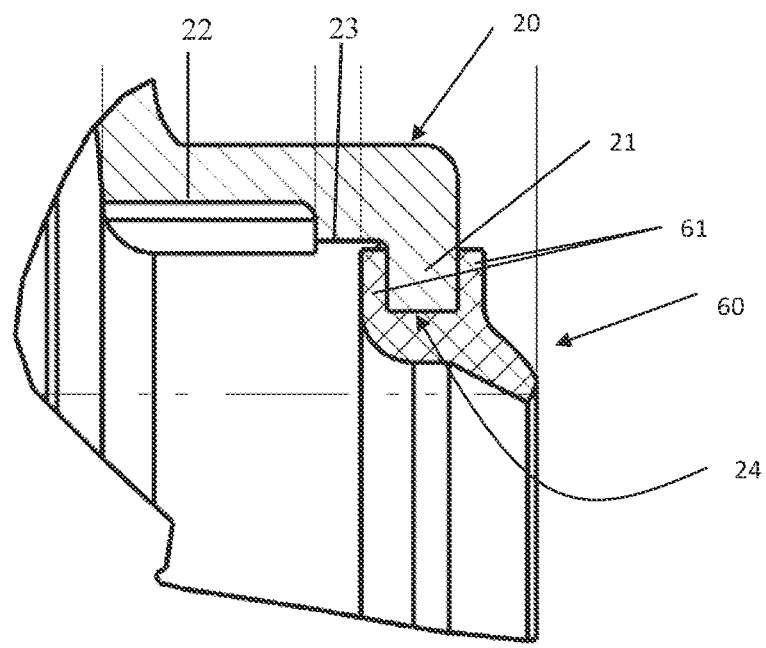
FIG. 3 shows a detail of assembly of a sealing means on the end cover of the housing element, according to a preferred embodiment of the disclosure.

With reference to FIG. 3, which shows a detail of assembly of an exemplary seal 60 on an exemplary end cover 20 of a housing element 10, it is possible to see that seal 60 is mounted on end cover 20 by means of interference between a radially inner edge 21 of end cover 20 and two protrusions 61 of seal 60, which protrude radially externally on seal 60 and located on opposite sides of the radially inner edge 21. Alternatively, the assembly of seal 60 on end cover 20 may also be performed by various known overmoulding processes.

Figure 4:
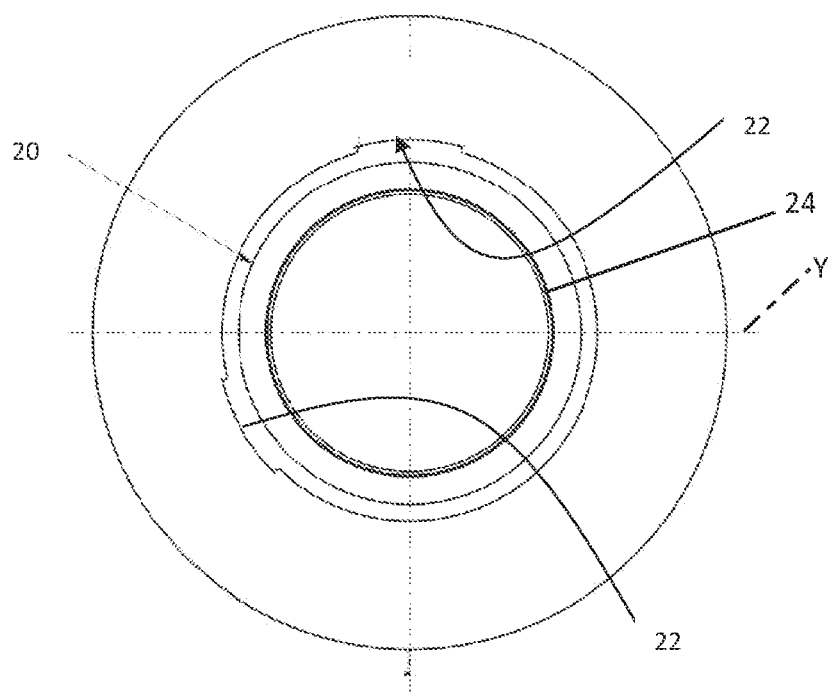
FIG. 4 shows a plan view of the end cover of the housing element, according to a further embodiment of the disclosure.

With reference to FIG. 4, which shows an exemplary plan view of an end cover 20 of a housing element 10, the end cover 20 is provided with two recesses 22 which are radially recessed from a radially internal surface 23 of the end cover 20 and located preferably on opposite sides or halves of end cover 20 about an axis of symmetry Y of the end cover 20. In this way, the end cover 20 may be used in applications in which the end cover 20 is locked on a shaft 50 by means of suitable locking means of known type, for example an Allen screw, pin or similar elements. This solution, therefore, is suitable for and compatible with the type of seal 60 devised according to the present disclosure, namely a static seal between end cover 20 and shaft 50.

Alternatively, but still with the aim of obtaining a static seal between end cover 20 and shaft 50, the end cover 20 may be assembled with interference on the radially inner ring 33 of the bearing unit 30. In particular, as shown in FIG. 2, the assembly by means of interference is performed between a radially external surface 33a of the radially inner ring 33 and the radially internal surface 23 of the end cover 20. This assembly by means of interference integrally fixes the end cover 20 to the radially inner ring 33 which, in turn, is integrally mounted on the shaft 50. In this way, the shaft 50, radially inner ring 33 and end cover 20 will be integral with each other and all rotatable at the same angular speed. The resultant effect, in this case also, will be that the sealing means 60 will act in the manner of a static type seal.

It is important to determine the value of the interference between the radially external surface 33a of the radially inner ring 33 and the radially internal surface 23 of the end cover 20. Excessive interference values, in fact, would induce unacceptable deformations in the end cover 20 which, as already mentioned, is made of plastic material. Experimental tests carried out on a series of prototypes have shown that the best performance is obtained for an interference value ranging between 0 mm and 0.085 mm.

In order to validate the performance of this new end cover provided with a static seal having an elastomeric sealing means, a series of tests was carried out in order to answer the following questions:
does the new end cover allow water to pass through?
is water able to infiltrate and wet the shielding surfaces of the bearing unit?

Two types of test were carried out. A first test involved allowing water droplets to fall between the shaft and cover, while a second test involved again allowing water droplets to fall, but this time on the edge of the cover. Both the tests were carried out using water at 22° C. and allowing the water droplets to fall for 10 minutes at a rate of 30 droplets per minute. At the end of testing both tests confirmed that no water was present inside the end cover 20 and no water was present on the shielding surfaces of the bearing unit 30.

In addition to the embodiments of the disclosure, as described above, it is to be understood that numerous further variants exist. It must also be understood that said embodiments are only examples and do not limit either the scope of the invention, nor its applications, nor its possible configurations. On the contrary, although the description provided above enables the person skilled in the art to implement the present disclosure at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A housing element configured for use in a manufacturing machinery comprising:
a casing provided with a spherical seat,
a bearing unit located inside the spherical seat of the casing,
a plastic end cover provided with an axial hole, passing through, and configured so that a machinery shaft is insertable inside, wherein the end cover is constrained to the shaft and rotatable together with the shaft, and
wherein the end cover is provided with an elastomeric sealing means configured to achieve a static seal on the shaft.

2. The housing element according to claim 1, further comprising a first interference between a radially inner edge of the end cover and two protrusions of the sealing means, protruding radially externally on the sealing means and placed on opposite sides with respect to the radially inner edge, so as to be configured to carry out the assembly of the sealing means on the end cover.

3. The housing element according to claim 2, further comprising a second interference between a radially external surface of a radially inner ring of the bearing unit and the radially inner surface of the end cover so as to be configured to carry out the assembly of the end cover on the radially inner ring.

4. The housing element according to claim 3, wherein the second interference has a value ranging between 0 mm and 0.085 mm.

5. The housing element according to claim 1, wherein the sealing means is overmoulded on the end cover.

6. The housing element according to claim 1, wherein the material of the elastomeric sealing means comprises polytetrafluoroethylene.

7. The housing element according to claim 6, wherein the material of the sealing means comprises a polytetrafluoroethylene resistant to temperatures up to 150° C.

8. The housing element according to claim 1, wherein the plastic material of the end cover comprises a polyamide.

9. The housing element according to claim 1, wherein the end cover is provided with two recesses radially recessed from a radially internal surface of the end cover and disposed on opposite halves of the end cover with respect to an axis of symmetry (Y) of the end cover.

10. A housing element configured for use in a manufacturing machinery comprising:
    a casing provided with a spherical seat,
    a bearing unit located inside the spherical seat of the casing,
    a plastic end cover provided with an axial hole, passing through, and configured so that a machinery shaft is insertable inside, wherein the end cover is constrained to the shaft and rotatable together with the shaft, the end cover is provided with an elastomeric sealing means configured to achieve a static seal on the shaft; wherein the sealing means is overmoulded on the end cover, further wherein the material of the elastomeric sealing means comprises polytetrafluoroethylene; and
    a first interference between a radially inner edge of the end cover and two protrusions of the sealing means, protruding radially externally on the sealing means and placed on opposite sides with respect to the radially inner edge, so as to be configured to carry out the assembly of the sealing means on the end cover.

11. A housing element configured for use in a manufacturing machinery comprising:
    a casing provided with a spherical seat,
    a bearing unit located inside the spherical seat of the casing,
    a plastic end cover provided with an axial hole, passing through, and configured so that a machinery shaft is insertable inside, wherein the end cover is constrained to the shaft and rotatable together with the shaft, the end cover is provided with an elastomeric sealing means configured to achieve a static seal on the shaft,
    a first interference between a radially inner edge of the end cover and two protrusions of the sealing means, protruding radially externally on the sealing means and placed on opposite sides with respect to the radially inner edge, so as to be configured to carry out the assembly of the sealing means on the end cover; and
    a second interference between a radially external surface of a radially inner ring of the bearing unit and the radially inner surface of the end cover so as to be configured to carry out the assembly of the end cover on the radially inner ring, wherein the second interference has a value ranging between 0 mm and 0.085 mm.

* * * * *